(12) United States Patent
Fischer et al.

(10) Patent No.: US 11,938,888 B2
(45) Date of Patent: Mar. 26, 2024

(54) ROOF-MOUNTED OCCUPANT RESTRAINT SYSTEM

(71) Applicant: ZF Passive Safety Systems US Inc., Washington, MI (US)

(72) Inventors: Kurt F. Fischer, Rochester, MI (US); Douglas M. Gould, Lake Orion, MI (US); Tobias Klenk, Boebingen (DE); Gabriela Diaz, Royal Oak, MI (US); Ronald Bielecki, Washington, MI (US); Hylus Ranjit Raj Jayakar, Shelby Township, MI (US)

(73) Assignee: ZF Passive Safety Systems US Inc., Washington, MI (US)

( * ) Notice: Subject to any disclaimer, the term of this patent is extended or adjusted under 35 U.S.C. 154(b) by 626 days.

(21) Appl. No.: 17/044,373

(22) PCT Filed: Mar. 26, 2019

(86) PCT No.: PCT/US2019/023966
§ 371 (c)(1),
(2) Date: Oct. 1, 2020

(87) PCT Pub. No.: WO2019/209442
PCT Pub. Date: Oct. 31, 2019

(65) Prior Publication Data
US 2021/0101559 A1  Apr. 8, 2021

Related U.S. Application Data

(60) Provisional application No. 62/661,667, filed on Apr. 24, 2018.

(51) Int. Cl.
*B60R 21/2338* (2011.01)
*B60R 21/00* (2006.01)
(Continued)

(52) U.S. Cl.
CPC ........ *B60R 21/2338* (2013.01); *B60R 21/214* (2013.01); *B60R 21/232* (2013.01);
(Continued)

(58) Field of Classification Search
CPC ... B60R 21/214; B60R 21/232; B60R 21/233; B60R 21/2338; B60R 21/2342;
(Continued)

(56) References Cited

U.S. PATENT DOCUMENTS 6,123,355 A * 9/2000 Sutherland ............ B60R 21/232
280/736
6,196,575 B1 * 3/2001 Ellerbrok .......... B60R 21/01512
280/743.1
(Continued)

FOREIGN PATENT DOCUMENTS

JP    2018070102 A  *  5/2018
JP    2018086886 A  *  6/2018
(Continued)

*Primary Examiner* — Laura Freedman
(74) *Attorney, Agent, or Firm* — TAROLLI, SUNDHEIM, COVELL & TUMMINO L.L.P.

(57) ABSTRACT

A restraint system for helping to protect an occupant of a vehicle having a roof and a cabin with a seat for the occupant includes an airbag having a stored condition within the roof and being inflatable to a deployed condition extending into the cabin and aligned with the seat. The airbag includes a first portion extending along the roof and a second portion extending away from the roof toward the occupant. The second portion being configured to fold away from the occupant in response to occupant penetration into the airbag.

16 Claims, 12 Drawing Sheets

(51) Int. Cl.
*B60R 21/214* (2011.01)
*B60R 21/231* (2011.01)
*B60R 21/232* (2011.01)
*B60R 21/2342* (2011.01)

(52) U.S. Cl.
CPC ............ *B60R 2021/0004* (2013.01); *B60R 2021/23107* (2013.01); *B60R 2021/23161* (2013.01); *B60R 2021/23382* (2013.01); *B60R 2021/23386* (2013.01); *B60R 21/2342* (2013.01)

(58) Field of Classification Search
CPC ........... B60R 2021/23107; B60R 2021/23153; B60R 2021/23161; B60R 2021/23308; B60R 2021/23316; B60R 2021/23382; B60R 2021/23386
See application file for complete search history.

(56) References Cited

U.S. PATENT DOCUMENTS

| | | | | |
|---|---|---|---|---|
| 6,283,500 B1 * | 9/2001 | Eckert | .............. | B60R 21/232 280/743.1 |
| 6,338,498 B1 * | 1/2002 | Niederman | ........... | B60R 21/232 280/730.2 |
| 6,457,740 B1 * | 10/2002 | Vaidyaraman | ........ | B60R 21/232 280/730.2 |
| 6,460,878 B2 * | 10/2002 | Eckert | ................ | B60R 21/2342 280/743.1 |
| 6,722,691 B1 | 4/2004 | Haland et al. | | |
| 6,932,380 B2 * | 8/2005 | Choi | .................... | B60R 21/232 280/730.1 |
| 7,055,852 B2 * | 6/2006 | Bakhsh | ................ | B60R 21/235 280/743.1 |
| 8,002,309 B2 * | 8/2011 | Kim | ..................... | B60R 21/214 280/743.2 |
| 8,020,888 B2 * | 9/2011 | Cheal | .................. | B60R 21/233 280/730.2 |
| 8,240,706 B2 * | 8/2012 | Bustos Garcia | ...... | B60R 21/261 280/728.2 |
| 8,393,637 B2 * | 3/2013 | Choi | .................... | B60R 21/231 280/743.2 |
| 8,403,358 B2 * | 3/2013 | Choi | .................... | B60R 21/214 280/743.2 |
| 8,414,017 B2 * | 4/2013 | Lee | ...................... | B60R 21/231 280/743.1 |
| 8,579,321 B2 * | 11/2013 | Lee | ...................... | B60R 21/233 280/729 |
| 9,446,733 B2 * | 9/2016 | Pausch | ................ | B60R 21/2334 |
| 9,533,650 B2 * | 1/2017 | Le Norcy | ............ | B60R 21/231 |
| 9,610,915 B2 * | 4/2017 | Specht | ................. | B60R 21/233 |
| 9,669,793 B2 * | 6/2017 | Jung | .................... | B60R 21/237 |
| 9,771,049 B2 * | 9/2017 | Lee | ...................... | B60R 21/213 |
| 10,272,868 B2 * | 4/2019 | Jaradi | .................. | B60R 21/264 |
| 10,486,639 B2 * | 11/2019 | Nagasawa | ........... | B60R 21/2338 |
| 10,583,799 B2 * | 3/2020 | Schneider | ........... | B60R 21/2338 |
| 10,589,708 B2 * | 3/2020 | Cho | .................... | B60R 21/0136 |
| 10,836,337 B2 * | 11/2020 | Shin | ..................... | B60R 21/214 |
| 10,857,965 B2 * | 12/2020 | Abe | ..................... | B60R 21/214 |
| 10,889,258 B2 * | 1/2021 | Jaradi | .................. | B60R 21/205 |
| 10,953,835 B2 * | 3/2021 | Gould | ..................... | B60N 2/01 |
| 10,974,685 B2 * | 4/2021 | Kwon | .................. | B60R 21/239 |
| 11,001,221 B2 * | 5/2021 | Fukawatase | .......... | B60R 21/232 |
| 11,040,687 B2 * | 6/2021 | Jayakar | ................ | B60R 21/214 |
| 11,059,449 B2 * | 7/2021 | Jayakar | ................ | B60R 21/214 |
| 11,155,231 B2 * | 10/2021 | Ohno | ................... | B60R 21/232 |
| 11,230,253 B2 * | 1/2022 | Hellot | .................. | B60R 21/239 |
| 11,279,311 B2 * | 3/2022 | Schroeder | ............ | B60R 21/233 |
| 11,338,758 B2 * | 5/2022 | Park | ..................... | B60R 21/2338 |
| 11,345,300 B2 * | 5/2022 | Fischer | ................ | B60R 21/239 |
| 11,351,949 B2 * | 6/2022 | Fischer | ................ | B60R 21/216 |
| 11,479,203 B2 * | 10/2022 | Jayakar | ................ | G02B 13/06 |
| 11,498,509 B2 * | 11/2022 | Fischer | ................ | B60R 21/261 |
| 11,535,185 B2 * | 12/2022 | Fischer | ................ | B60R 21/239 |
| 11,560,117 B2 * | 1/2023 | Navarro Arranz | .... | B60R 21/214 |
| 11,613,226 B2 * | 3/2023 | Fischer | ................ | B60R 21/233 280/730.1 |
| 11,618,408 B2 * | 4/2023 | Freisler | ................ | B60R 21/233 280/729 |
| 2005/0151351 A1 | 7/2005 | Enders et al. | | |
| 2011/0272928 A1 | 11/2011 | Czach et al. | | |
| 2016/0288762 A1 | 10/2016 | Deng et al. | | |
| 2019/0161048 A1 | 5/2019 | Thomas et al. | | |
| 2019/0161049 A1 | 5/2019 | Thomas et al. | | |
| 2021/0031718 A1 * | 2/2021 | Schultz | ................ | B60R 21/231 |
| 2022/0017036 A1 * | 1/2022 | Jeong | .................. | B60R 21/214 |
| 2022/0212622 A1 * | 7/2022 | Gould | .................. | B60R 21/216 |
| 2022/0250573 A1 * | 8/2022 | Jayakar | ................ | B60R 21/232 |
| 2023/0026681 A1 * | 1/2023 | Fischer | ................ | B60R 21/232 |

FOREIGN PATENT DOCUMENTS

| | | | |
|---|---|---|---|
| JP | 2019043474 A * | 3/2019 | |
| KR | 20170002780 A * | 1/2017 | |
| KR | 20170044362 | 4/2017 | |
| WO | WO-2018012363 A1 * | 1/2018 | ........... B60R 21/214 |

* cited by examiner

ROOF-MOUNTED OCCUPANT RESTRAINT SYSTEM

CROSS REFERENCE TO RELATED APPLICATIONS

This application is a national stage of International Application No. PCT/US2019/023966, filed Mar. 26, 2019, which claims benefit of U.S. Provisional Appln. No. 62/661,667 filed Apr. 24, 2018. The disclosures of these applications are incorporated herein by reference in their entireties.

TECHNICAL FIELD

The present invention relates generally to vehicle airbags and, in particular, relates to a roof-mounted airbag having at least one weakening for facilitating folding of the airbag.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner Vehicle manufacturers are free to utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

According to one aspect, a restraint system for helping to protect an occupant of a vehicle having a roof and a cabin with a seat for the occupant includes an airbag having a stored condition within the roof and being inflatable to a deployed condition extending into the cabin and aligned with the seat. The airbag includes a first portion extending along the roof and a second portion extending away from the roof toward the occupant. The second portion being configured to fold away from the occupant in response to occupant penetration into the airbag.

According to another aspect, a restraint system for helping to protect an occupant of a vehicle having a roof and a cabin with a seat for the occupant includes an airbag having a stored condition within the roof and being inflatable to a deployed condition extending into the cabin and aligned with the seat. The airbag includes a first portion extending along the roof and a curved second portion extending away from the roof and configured to engage a lap of the occupant prior to occupant penetration into the second portion.

According to another aspect, taken alone or in combination with any other aspect, the first portion pulls away from the roof in response to occupant penetration into the airbag.

According to another aspect, taken alone or in combination with any other aspect, the second portion is curved about an axis positioned on a side of the airbag opposite the occupant.

According to another aspect, taken alone or in combination with any other aspect, a tether extends within the second portion and connected to inverted portions of the second portion to define a weakening.

According to another aspect, taken alone or in combination with any other aspect, the second portion extends along a centerline and the weakening extends about the centerline.

According to another aspect, taken alone or in combination with any other aspect, a second weakening in the second portion is located closer to the first portion than the weakening to define a segment of the second portion that pivots about the weakening in response to occupant penetration into the second portion.

According to another aspect, taken alone or in combination with any other aspect, a tether extends within the second portion and is connected to inverted portions of the second portion to define the second weakening.

According to another aspect, taken alone or in combination with any other aspect, the second portion is curved such that the second weakening automatically forms in the second portion in response to occupant penetration into the second portion.

According to another aspect, taken alone or in combination with any other aspect, a weakening is formed in the first portion to define a segment of the first portion that pivots away from the roof in response to occupant penetration into the second portion.

According to another aspect, taken alone or in combination with any other aspect, the first portion extends along a centerline in a fore-aft direction of the vehicle and the weakening in the first portion extends about the centerline.

According to another aspect, taken alone or in combination with any other aspect, the second portion is configured to engage a lap of the occupant prior to occupant penetration into the second portion.

According to another aspect, taken alone or in combination with any other aspect, a supporting tether has a first end secured to the second portion of the airbag and a second end secured to the vehicle roof.

According to another aspect, taken alone or in combination with any other aspect, the second portion includes an inflatable projection extending substantially parallel to the first portion for engaging the occupant.

According to another aspect, taken alone or in combination with any other aspect, the projection has a free end secured to the second portion with tear stitching. The projection is uninflated prior to rupturing of the tear stitching and is inflated after rupturing of the tear stitching.

According to another aspect, taken alone or in combination with any other aspect, a lower end of the airbag has a portion with a coefficient of friction greater than the coefficient of friction of the fabric of the airbag.

According to another aspect, taken alone or in combination with any other aspect, an opening extends laterally through the airbag and defines an uninflated volume of the airbag.

According to another aspect, taken alone or in combination with any other aspect, a tether extends within the second portion and is connected to inverted portions of the second portion to define a weakening such that occupant engagement with the second portion causes the second portion to fold away from the penetrating occupant at the weakening and causes the first portion to pull away from the roof.

According to another aspect, taken alone or in combination with any other aspect, the second weakening automatically forms in the second portion in response to occupant penetration into the second portion.

According to another aspect, taken alone or in combination with any other aspect, a weakening is formed in the first portion to define a segment of the first portion that pivots away from the roof in response to occupant penetration into the second portion.

Other objects and advantages and a fuller understanding of the invention will be had from the following detailed description and the accompanying drawings.

DETAILED DESCRIPTION

Figure 1:
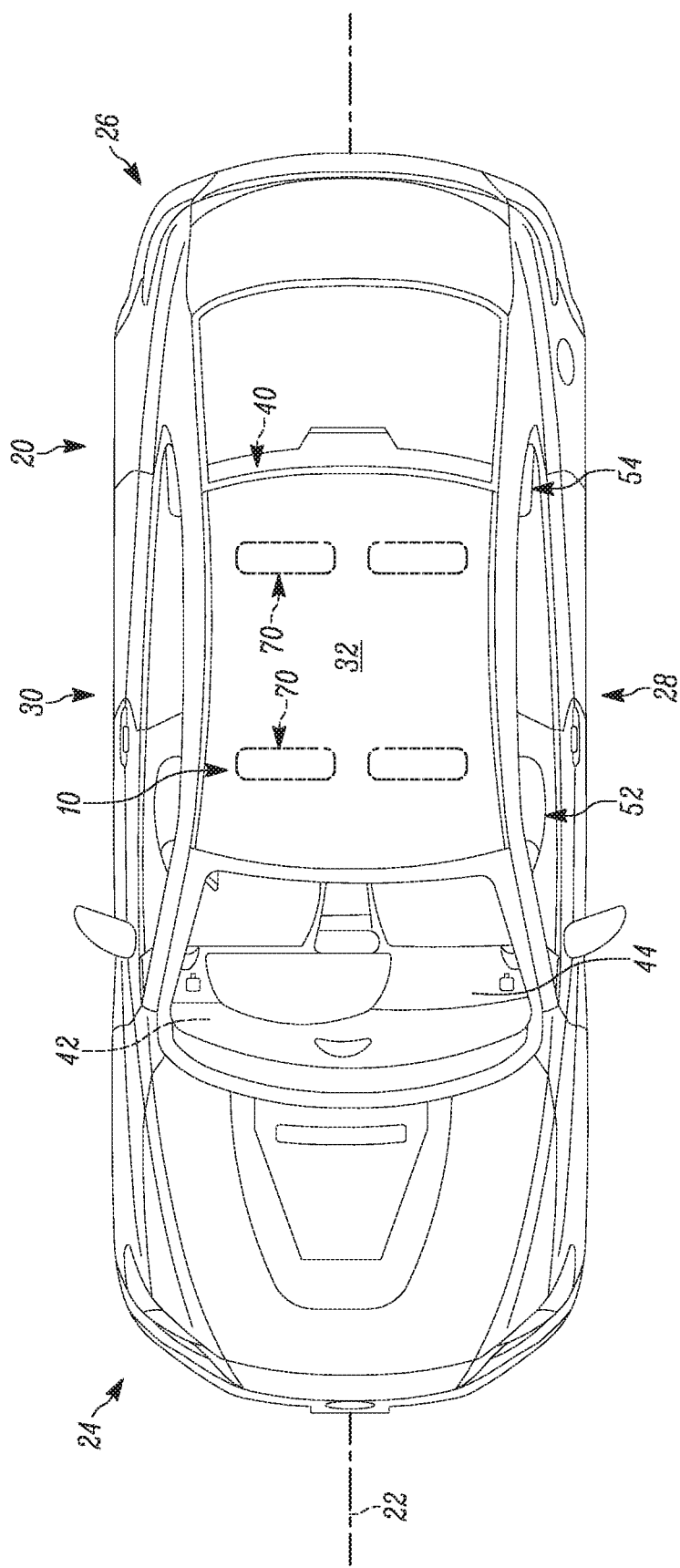
FIG. 1 is a top view of a vehicle including an example roof-mounted, occupant restraint system.
Figure 2:
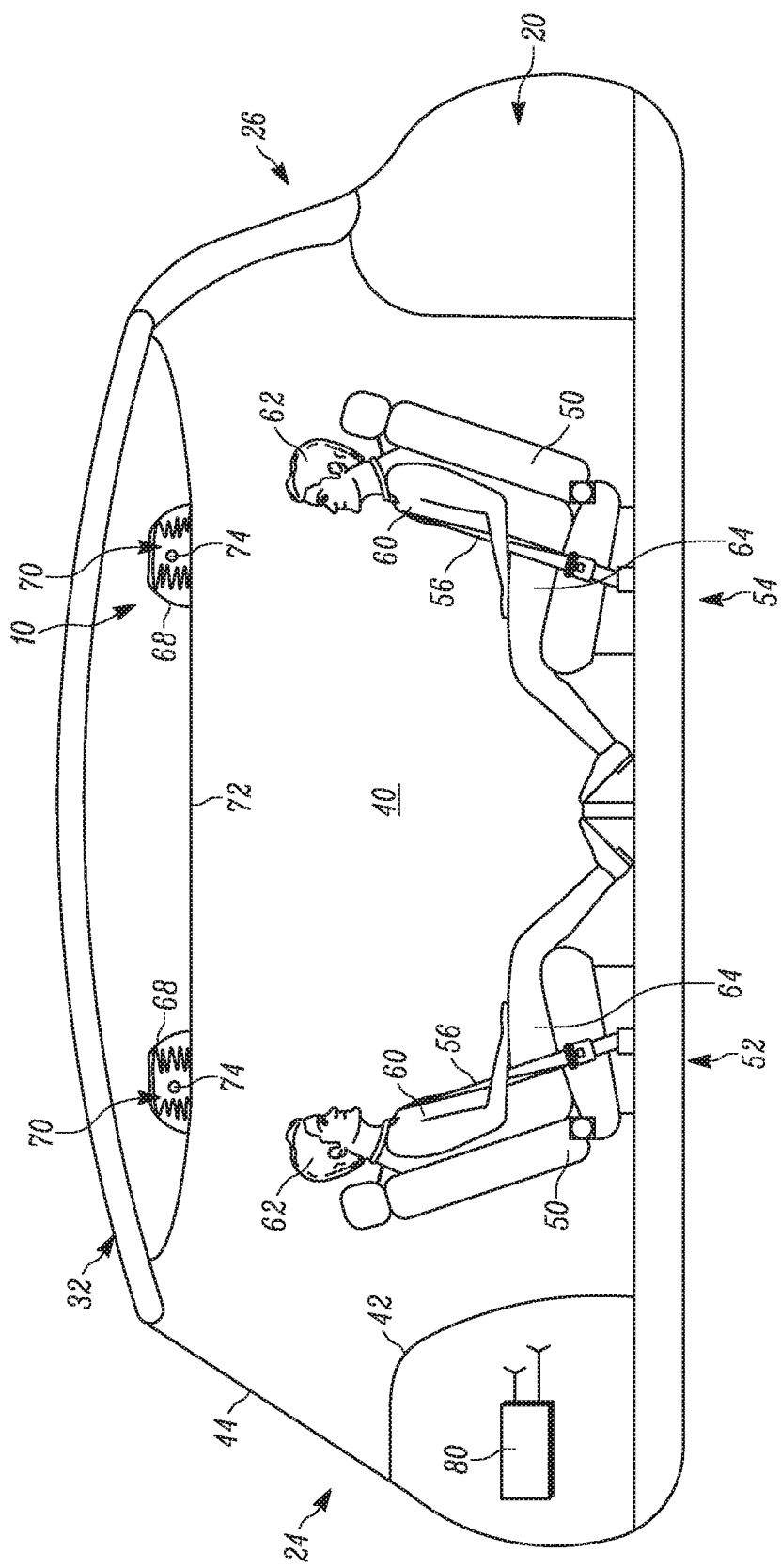
FIG. 2 is a schematic illustration of a cabin of the vehicle with an airbag of the restraint system in a stored condition.

The present invention relates generally to vehicle airbags and, in particular, relates to a roof-mounted airbag having at least one weakening for facilitating folding of the airbag. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22. The first end 24 of the vehicle 20 includes an instrument panel 42 facing a passenger compartment or cabin 40. A windshield or windscreen 44 can be located between the instrument panel 42 and the roof 32.

The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40.

Seats 50 are positioned in the cabin 40. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, facing each other, with the front row facing rearward toward the rear row. Alternatively, the front and rear rows 52 and 54 can both be arranged in a forward-facing manner (not shown), similar to that of conventional automobiles. In either case, each seat 50 is fitted with a seatbelt 56 for restraining its occupant 60. Control interfaces for climate controls, GPS, navigation, entertainment, etc. can, for example, be provided in a center console area of the vehicle 20 located between the occupants 60 of the front and/or rear rows 52, 54.

For the unconventional, forward-rearward seating arrangement of FIG. 2, in the event of a frontal crash, the occupants 60 of the forward-facing rear row 54 are restrained by their respective seatbelts 56. Occupants 60 of the rear-facing front row 52, while buckled, are supported in a frontal crash by the seatbacks of the vehicle seats 50. Because of this, the seats 50 must be constructed to support the occupants 60 in the event of a crash. For the forward-facing occupants 60 in the rear row 54, the seatbelts 56 offer some degree of restraint. It is desirable, however, for both rows 52, 54 to include additional restraints for head and neck support.

Since the front row 52 need not face forward and need not be in close proximity to the instrument panel 42 or the area where an instrument panel would normally reside, there can be a large volume of space between the front row 52 and the forward cabin structure presented facing the front row. Because of this, it may not be efficient to deploy airbags from this location due to the large volume that the airbags would need to occupy. This would present problems in sizing the airbag(s) and inflator(s) to occupy that large volume, and could also present problems in deploying the airbag(s) into that large volume in the necessary short time required to protect the occupants in a crash scenario.

It is therefore evident that the various passenger seating configurations enabled by autonomous vehicles can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface, such as an instrument panel, presents additional challenges.

With this in mind, the occupant restraint system 10 shown in FIGS. 1-2 includes at least one vehicle occupant protection device in the form of an inflatable curtain airbag 70 mounted in the roof 32 of the vehicle 20. Mounting the airbags 70 in the vehicle roof 32 is convenient because the airbags can be positioned in a location with a desired proximity to the occupant(s) 60 they are intended to help protect. This can help reduce the necessary inflatable volume of the airbags 70 and can also help provide a desired airbag deployment time without requiring an excessively high-volume inflator.

The airbags 70 are housed/concealed in the roof structure of the vehicle 20 behind, for example, a roof liner 72. The airbag 70 is at least one of rolled and folded before being placed behind the roof liner 72. The rolled airbag 70 can be provided in a cover or housing/module 68 that is then placed behind the roof liner 72. The occupant restraint system 10 also includes an inflator 74 positioned in each housing 68 for providing inflation fluid to each airbag 70. The inflators 74 are operatively connected (e.g., by wires) to an airbag controller 80 (see FIG. 2) that includes or communicates with one or more crash sensors (not shown). The airbag controller 80 is operative to determine the occurrence of a crash event and to actuate the inflators 74 in a known manner to inflate the airbags 70. The inflators 74 can be of any known type, such as stored gas, solid propellant, augmented or hybrid.

The airbag 70 can be constructed of any suitable material, such as nylon (e.g., woven nylon 6-6 yarns), and may be constructed in any suitable manner For example, the airbag 70 may include one or more pieces or panels of material. If more than one piece or panel is used, the pieces or panels can be interconnected by known means, such as stitching, ultrasonic welding, heat bonding, or adhesives, to form the airbag 70. The airbag 70 can be uncoated, coated with a material, such as a gas impermeable urethane, or laminated with a material, such as a gas impermeable film. The airbag 70 can therefore have a gas-tight or substantially gas-tight construction. Those skilled in the art will appreciate that alternative materials, such as polyester yarn, and alternatives coatings, such as silicone, may also be used to construct the airbag 70.

The occupant restraint system 10 can include multiple airbags 70 provided along the roof 32 and within the roof liner 72 at locations associated and aligned with each seat 50 in each row 52, 54. In other words, each seat 50 in the vehicle 20 can have an individual module 68 (with corresponding airbag 70 and inflator 74) associated and aligned therewith. In each case, the airbag 70 is positioned in front of the associated seat 50 in each row 52, 54 in the direction the occupants 60 in those seats would face (i.e., rearward of the front row 52 and forward of the rear row 54). The airbags 70 extend in the left-to-right direction of the vehicle 20 and generally parallel to the width of the seats 50. Alternatively, a single airbag 70 can span the entire width of the cabin 40 to protect all the occupants 60 in an entire row 52 or 54 (not shown). In the example shown in FIG. 2, airbags 70 are provided behind the roof liner 72 and associated with a seat 50 in each row 52, 54. Although the airbags 70 are identical, the construction and operation of only the airbag associated with a seat 50 in the front row 52 is discussed for brevity.

Figure 3A:
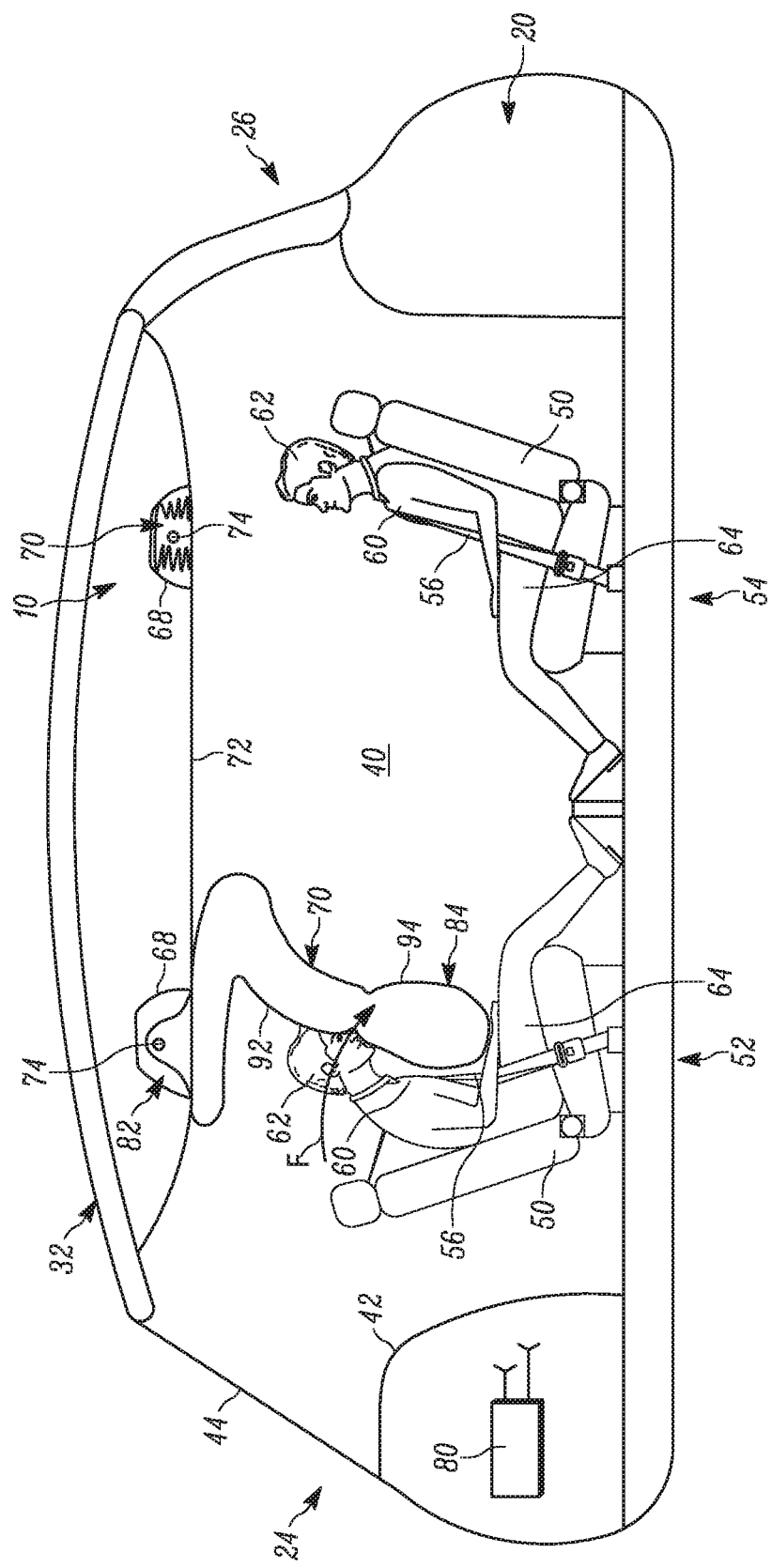
FIG. 3A is a schematic illustration of the cabin of the vehicle with the airbag in a deployed condition.

As shown in FIG. 3A, upon sensing the occurrence of an event for which inflation of the airbag 70 is desired, such as a vehicle collision, the controller 80 provides signals to the inflator 74. Upon receiving the signals from the controller 80, the inflator 74 is actuated and provides inflation fluid to the inflatable volume of the airbag 70 in a known manner. The inflating airbag 70 exerts a force on the roof liner 72, which causes the roof liner to open (e.g., via tear seam or door). This releases the airbag 70 to inflate and deploy from its stored condition behind the roof liner 72 to a deployed condition extending into the cabin 40 forward and aligned with a seat 50 in the front row 52. The airbag 70, while inflated, helps protect the vehicle occupant 60 in the front row 52 by absorbing the impact of the occupant.

The inflated airbag 70 extends from an upper end 82 to a lower end 84. The upper end 82 is connected to the vehicle 20 and fluidly connected to the inflator 74. The lower end 84 is positioned adjacent an occupant 60 in the front row 52. As shown, the lower end 84 abuts or engages the lap/lower torso 64 of the occupant 60.

Figure 3B:
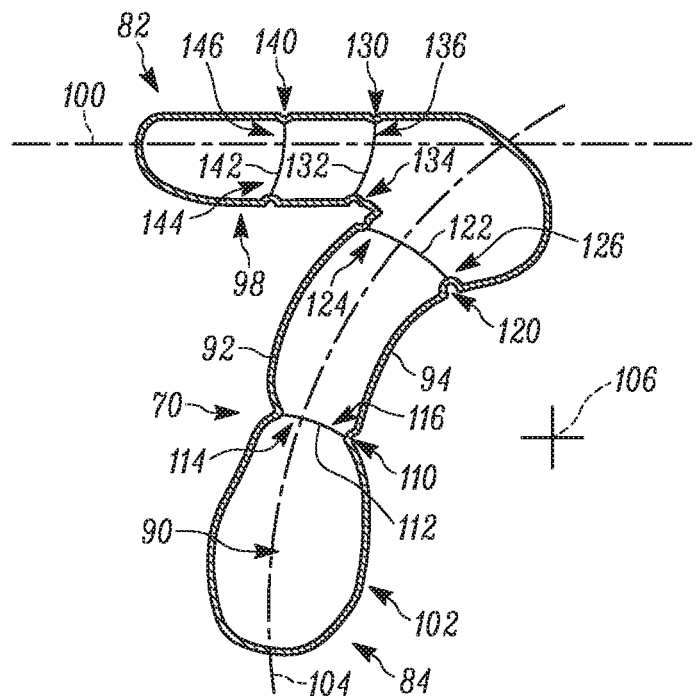
FIG. 3B is an enlarged sectional view of a portion of the airbag of FIG. 3A.

Referring further to FIG. 3B, the airbag 70 includes an inflatable volume 90 defined between first and second panels 92, 94 of material. The first panel 92 faces towards the occupant 60 and, more specifically, faces a head 62 of the occupant. The second panel 94 faces away from the occupant. A first portion 98 of the airbag 70 extends along the roof liner 72 and has a centerline 100 in the fore-aft direction of the vehicle 20. The first portion 98 can be longer or shorter than what is shown in FIG. 3B. A second portion 102 of the airbag 70 extends downward from the first portion 98 away from the roof liner 72 and towards the occupant 60. The second portion 102 extends along a centerline 104 and is curved towards the occupant 60. More specifically, the second portion 102 is curved about an axis 106 located on the other side of the second portion from the occupant 60 and therefore curves toward the occupant.

At least one weakening having a reduced cross-sectional area is formed along the second portion 102 and about the centerline 104. As shown, first and second weakenings 110, 120 are formed in the second portion 102. The first weakening 110 is located closer to the lower end 84 of the airbag 70. The second weakening 120 is located closer to the roof liner 72. The second weakening 120 could alternatively be omitted (not shown).

In one example, the first weakening 110 is formed by securing a tether 112 to the opposing panels 92, 94 within the second portion 102. In particular, the tether 112 has a first end 114 secured to the first panel 92 and a second end 116 secured to the second panel 94. The length of the tether 112 is such that the first and second panels 92, 94 are inverted towards one another and into the inflatable volume 90, thereby forming the first weakening 110. For the second weakening 120, another tether 122 is provided within the second portion 102 and has a first end 124 secured to the first panel 92 and a second end 126 secured to the second panel 94 at a location spaced from the tether 112 and closer to the roof liner 72. The length of the tether 122 is such that the first and second panels 92, 94 are inverted towards one another and into the inflatable volume 90 to form the second weakening 120.

At least one weakening having a reduced cross-sectional area can also be formed along the first portion 98 and about the centerline 104. As shown, third and fourth weakenings 130, 140 are formed in the first portion 98. The third weakening 130 is located closer to the second portion 102 of the airbag 70 (e.g., adjacent the intersection between the first and second portions 98, 102). The fourth weakening 140 is located closer to the windshield 44. It will be appreciated that either or both the third and fourth weakenings 130, 140 can be omitted (not shown).

For the third weakening 130, a tether 132 is provided within the first portion 98 and includes a first end 134 secured to the first panel 92 and a second end 136 secured to the second panel 94. The length of the tether 132 is such that the first and second panels 92, 94 are inverted towards one another and into the inflatable volume 90 to form the third weakening 130. For the fourth weakening 140, a tether 142 is provided within the first portion 98 and has a first end 144 secured to the first panel 92 and a second end 146 secured to the second panel 94 at a location spaced from the tether 132 and closer to the windshield 44. The length of the tether 142 is such that the first and second panels 92, 94 are inverted towards one another and into the inflatable volume 90 to form the fourth weakening 140.

Although tethers 112, 122, 132, 142 are shown forming the weakenings 110, 120, 130, 140 any or all of the weakenings could likewise be formed and maintained by inverting portions of the second portion 102 encircling the centerline 104 and fastening (e.g., by adhesive, welding and/or stitching) the inverted portion along its length about the centerline 104 (not shown).

Figure 3C:
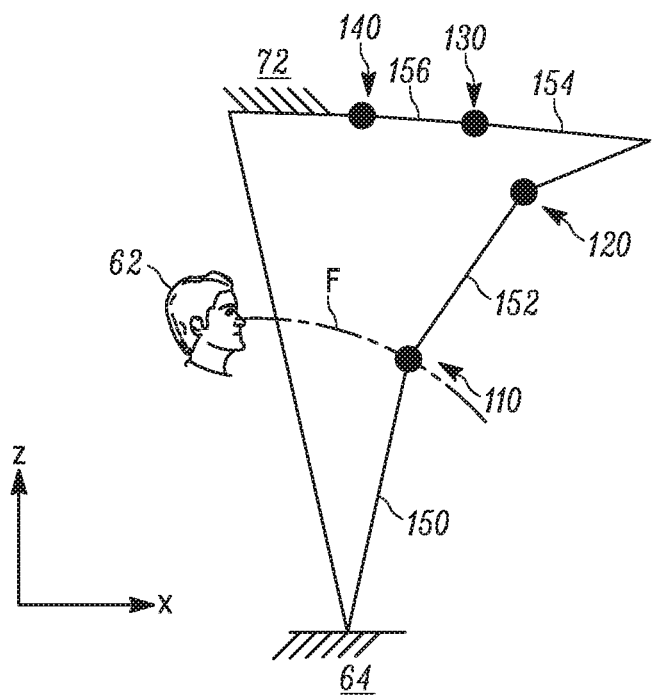
FIG. 3C is a kinematic illustration of the airbag of FIG. 3B.

A kinematic relationship between the restricted airbag 70 and the occupant 60 after deployment and prior to engagement of the occupant is shown in FIG. 3C. As shown, the weakenings 110, 120, 130, 140 define segments 150, 152, 154, 156 of the airbag 70 linked to one another and to the locations where the airbag is fixed in place (i.e., at the roof liner 72 and occupant's lap 64).

Because the occupant 60 is belted, a frontal crash resulting in forward occupant movement causes the occupant to bend at the waist and follow an angled or arcuate path toward the airbag 70, as indicated generally by the arrow F in FIG. 3A. The movement by the occupant 60 is therefore in multiple directions, namely, in the horizontal or x direction away from the seat 50 and in the vertical or z direction away from the roof liner 72.

Figure 4A:
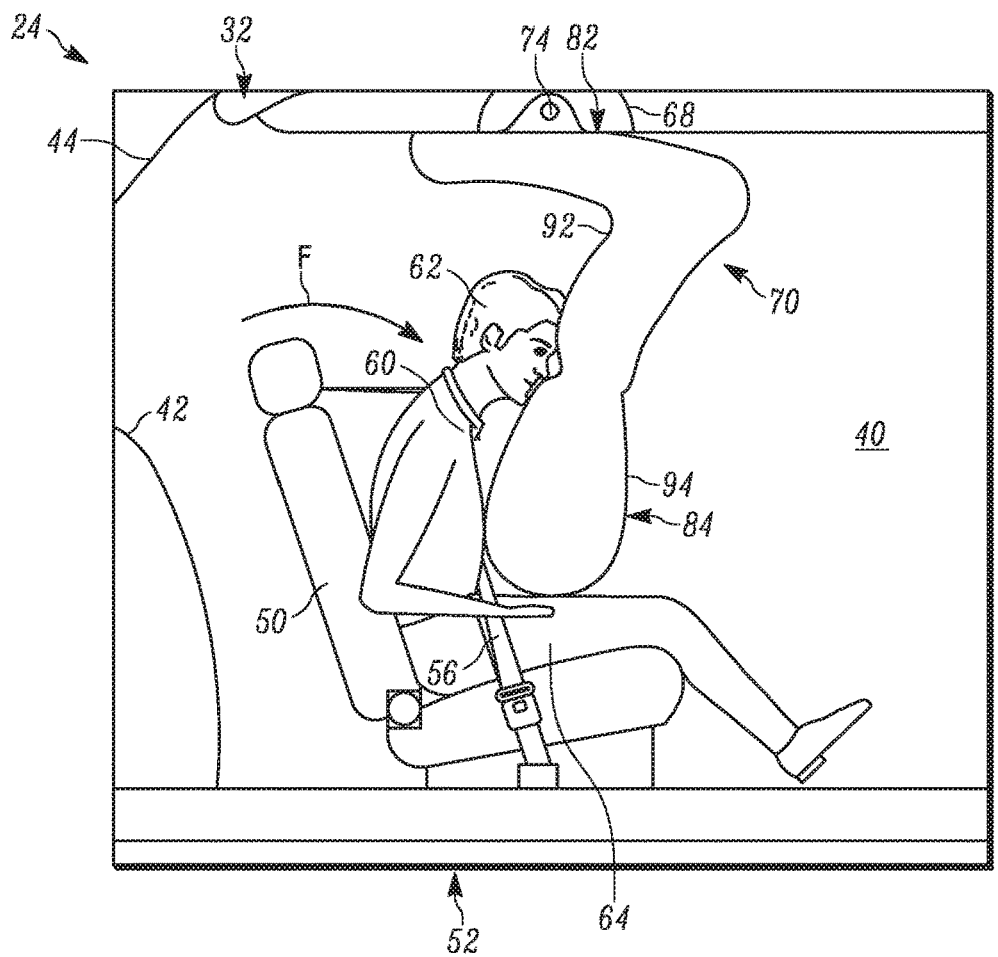
FIG. 4A is a schematic illustration of the cabin of the vehicle following occupant penetration into the deployed airbag.

Once the moving occupant 60 engages and penetrates the inflated second portion 102 (FIG. 4A), the airbag 70 is urged to move in the direction F. Since the roof liner 72 and occupant's lap 64 hold/fix the ends 82, 84 of the airbag 70 in place the penetrating occupant 60 causes the airbag to fold or bend away from the occupant 60 at the first weakening 110 in the second portion 102. The location of the first weakening 110 along the centerline 104 is selected such that the occupant's head 62 will engage and penetrate the second portion 102 below the first weakening. The first weakening 110 acts as a weakened portion of the second portion 102 to facilitate folding of the second portion away from the penetrating occupant 60.

Figure 4B:
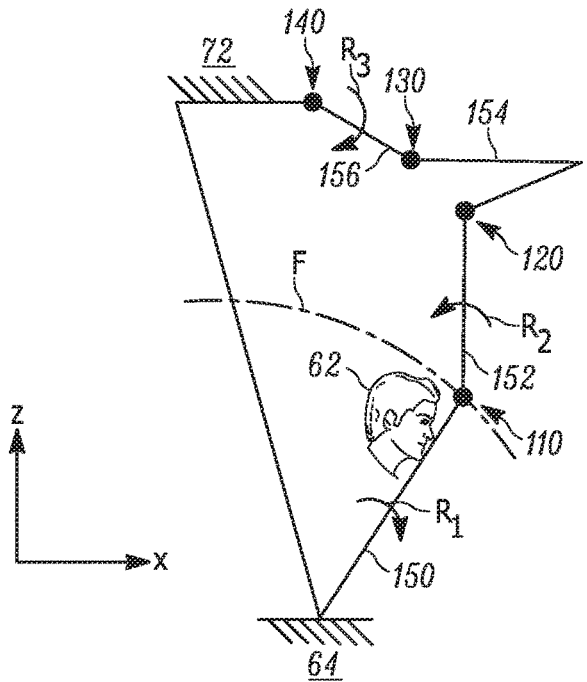
FIG. 4B is a kinematic illustration of the airbag of FIG. 4A.

As noted, there is no vehicle structure in position to act as a reaction surface to constrain movement of the deployed airbag 70. By configuring the second portion 102 to engage the occupant's lap 64, the lap holds the second portion and acts as a reaction surface for the lower end 84 of the airbag 70. As shown in FIG. 4B, this allows the segment 150 to pivot about the occupant's lap 64 in the clockwise manner $R_1$ in response to occupant 60 penetration (see FIG. 4B). Due to the aforementioned curvature of the second portion 102, the segment 152, in response to the segment 150 pivoting in the manner $R_1$, pivots in the counterclockwise manner R2 about the first weakening 110.

The placement and curvature of the second portion 102 relative to the occupant 60 can be configured such that once the segment 150 pivots in the manner $R_1$ the second weakening 120 automatically forms in the second portion, thereby allowing the segment 152 to pivot in the manner $R_2$ and the segment 154 to be pulled down away from the roof liner 72. In other words, the second weakening 120 does not need to be pre-formed in the second portion 102 but can instead be formed as a result of the segment 150 pivoting in the manner $R_1$.

In any case, pivoting the segment 152 in the manner R2 pulls the segment 154 downwards in the z direction and away from the roof liner 72. This, in turn, causes the segment 156 to pivot in the clockwise manner R3 about the fourth weakening 140, which is fixed to the roof liner 72 adjacent to the inflator 74.

In other words, occupant 60 penetration into the airbag 70 causes the airbag to not only fold away from the occupant in the horizontal direction but also pull downwards away from the roof liner 72 in the vertical direction. As a result, the airbag 70 provides a ride-down effect on the moving occupant 60 to thereby help reduce loads thereon. The folding airbag 70 accommodates the moving occupant 60 by providing a more gradual reaction force in response to occupant penetration.

It will be appreciated that the airbag 70 can be tailored to allow for a prescribed degree of folding and/or pulling away from the roof liner 72 in response to occupant 60 penetration into the second portion 102. To this end, the number of weakenings 110, 120, 130 and/or 140, the depth of each weakening towards the respective centerlines 100, 104 and/or the location of each weakening along the respective centerlines can all be adjusted. In one example, the airbag 70 includes only a single weakening 110 on the second portion 102 at a location above (i.e., closer to the roof liner 72) where the occupant's head 62 engages and penetrates the second portion.

Regarding the depth of the weakening 110, it will be appreciated that a longer tether 112 would result in a shallower weakening and, thus, a second portion 102 that is more difficult to fold. On the other hand, a shorter tether 112 inverts the panels 92, 94 further into the inflatable volume 90 and thereby produces a second portion 102 that is easier to fold. The same would be true for any other tethers 122, 132, 142 provided.

At least one of the first portion 98 and the second portion 102 can include a vent (not shown) for venting inflation fluid from the respective first and second portion in response to occupant 60 penetration into the second portion. The vent can be sized to stiffen or soften the airbag 70 and thereby control the forces acting on the penetrating occupant 60.

Figure 5:
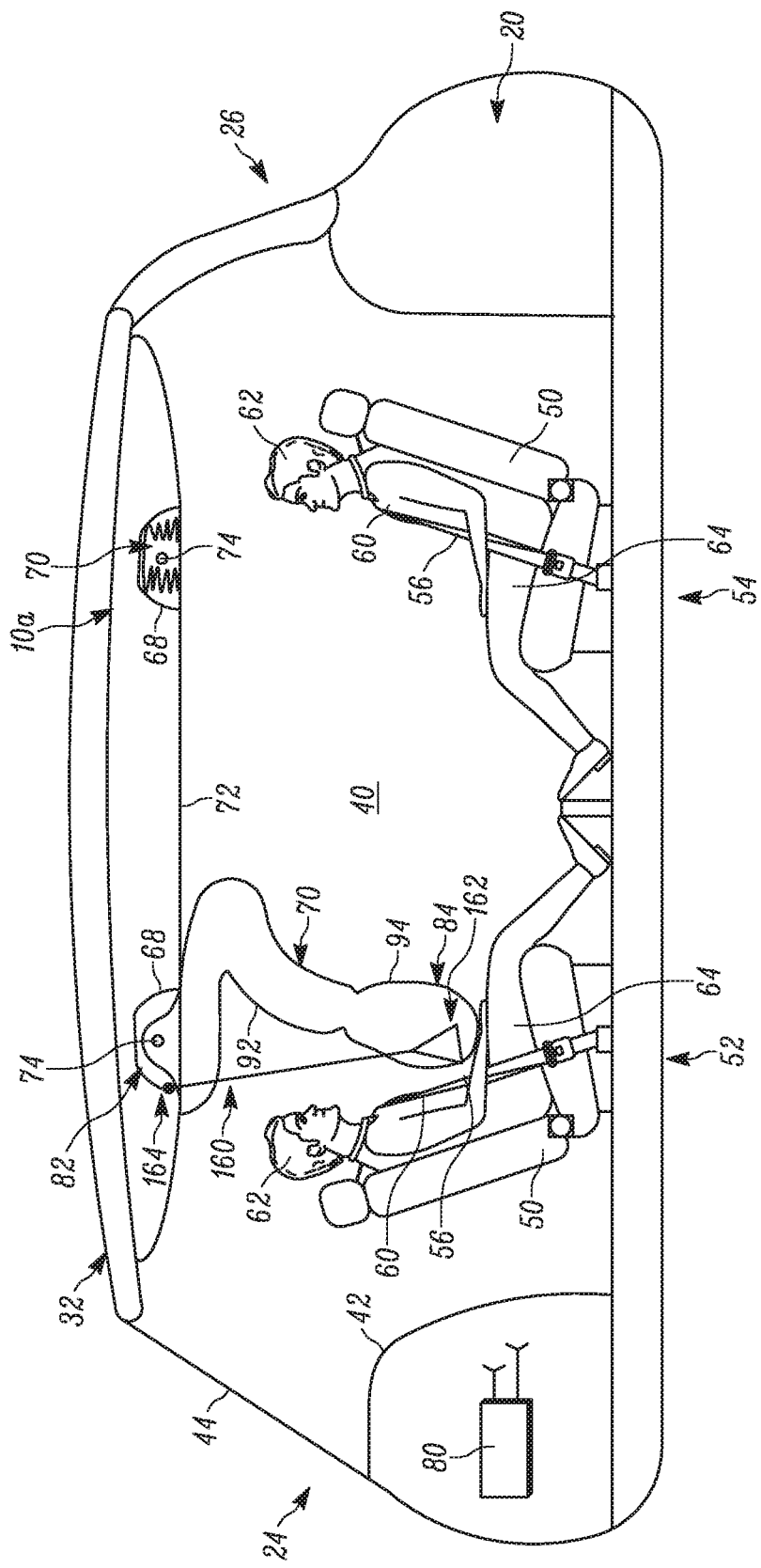
FIG. 5 is a schematic illustration of the cabin of the vehicle with another example airbag in a deployed condition.
Figure 6:
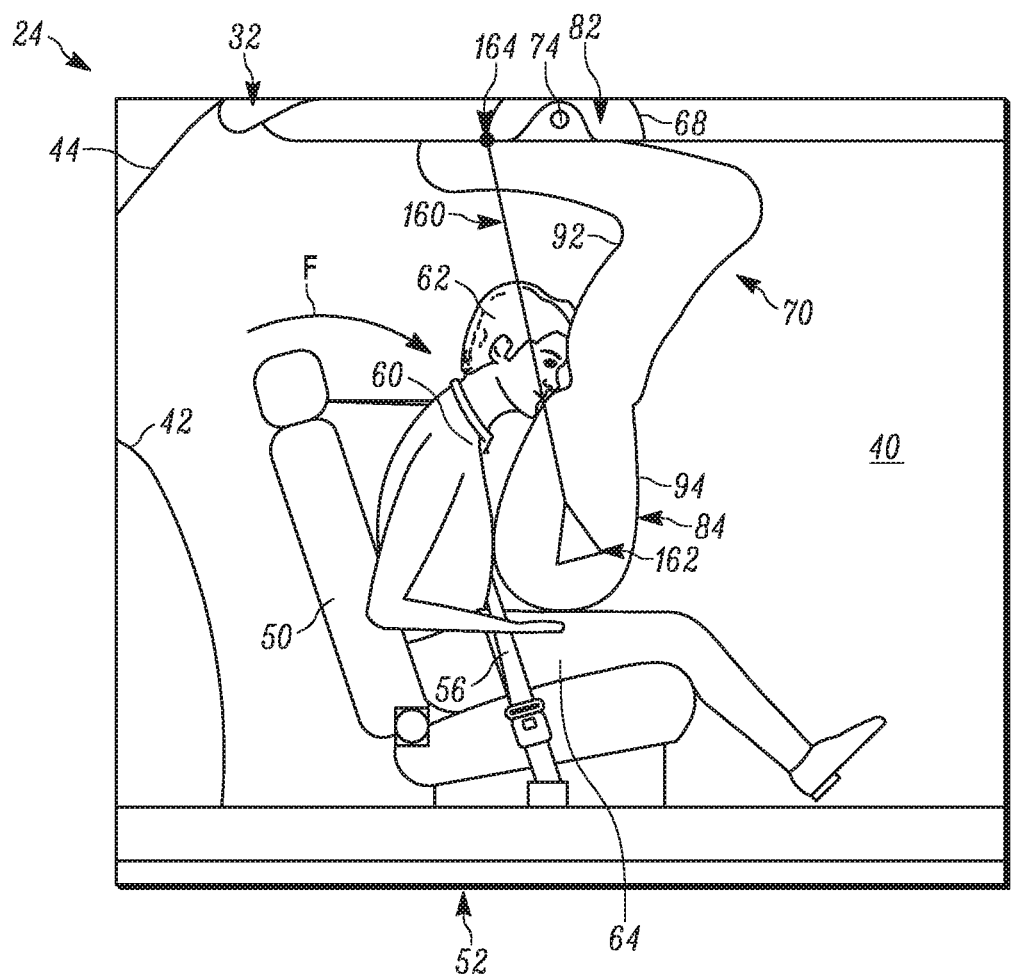
FIG. 6 is a schematic illustration of the cabin of the vehicle following occupant penetration into the deployed airbag of FIG. 5.

In another embodiment shown in FIG. 5-6, the occupant restraint system 10a includes one or more supporting tethers 160 connected to the airbag 70 and the vehicle 20 for providing the reaction surface for the deploying airbag 70. Each supporting tether 160 is formed as a single piece of inextensible material and includes a first end 162 connected to the lower end 84 of the airbag 70. A second end 164 of the supporting tether 160 is connected to the module 68 (as shown) or the roof 32 (not shown). The first end 162 act as a stress reducer for spreading the connection between the supporting tether 160 and the airbag 70 over a larger surface area of the airbag fabric so as to prevent tearing.

In one example, two supporting tethers 160 are connected to the roof 32 on opposite sides of the airbag 70, namely, the inboard and outboard sides of each airbag. The supporting tethers 160 are also connected to the roof 32 at locations that are rearward of the first panel 92 of the airbag 70. As noted, a frontal crash causes the occupant to bend at the waist and follow the angled or arcuate path F toward the airbag 70. Advantageously, as shown in FIG. 5, the location of the second end 164/roof 32 connections can be selected such that the supporting tethers 160 extend in a direction or along a path that approximates or coincides with (i.e., lies substantially parallel to or coextensive with) the path along which the occupant 60 travels into contact with the airbag 70.

In this manner, the tension the supporting tethers 160 apply to the airbag 70 in response to occupant 60 penetration into the second portion 102 can be opposite to the impact forces applied to the airbag by the penetrating occupant. As a result, the roof 32, through the supporting tethers 160, acts as the reaction surface for the airbag 70. The example configuration of FIG. 5 therefore requires no interaction with forward structure of the vehicle 20, such as an instrument panel, steering wheel, or seat, to provide a reaction surface for the airbag 70.

Since the supporting tethers 160 act to supply the reaction force for the airbag 70 the lower end 84 of the airbag does not need to engage the occupant's lap 64. Consequently, the lower end 84 of the airbag 70, when deployed, is spaced from the occupant's lap 64. When the occupant 60 engages and penetrates the second portion 102 of the airbag 70 the airbag folds horizontally away from the occupant and pulls vertically away from the roof liner 72 in the same kinematic manner shown in FIG. 4B—with the exception that the segment 150 pivots clockwise in the manner $R_1$ about the first end 162 of the supporting tether 160 and not the occupant's lap 64. With this in mind, the length of the supporting tethers 160 can be adjusted to tailor not only where the occupant 60 engages the second portion 102 but also occupant loading into the second portion.

Figure 7:
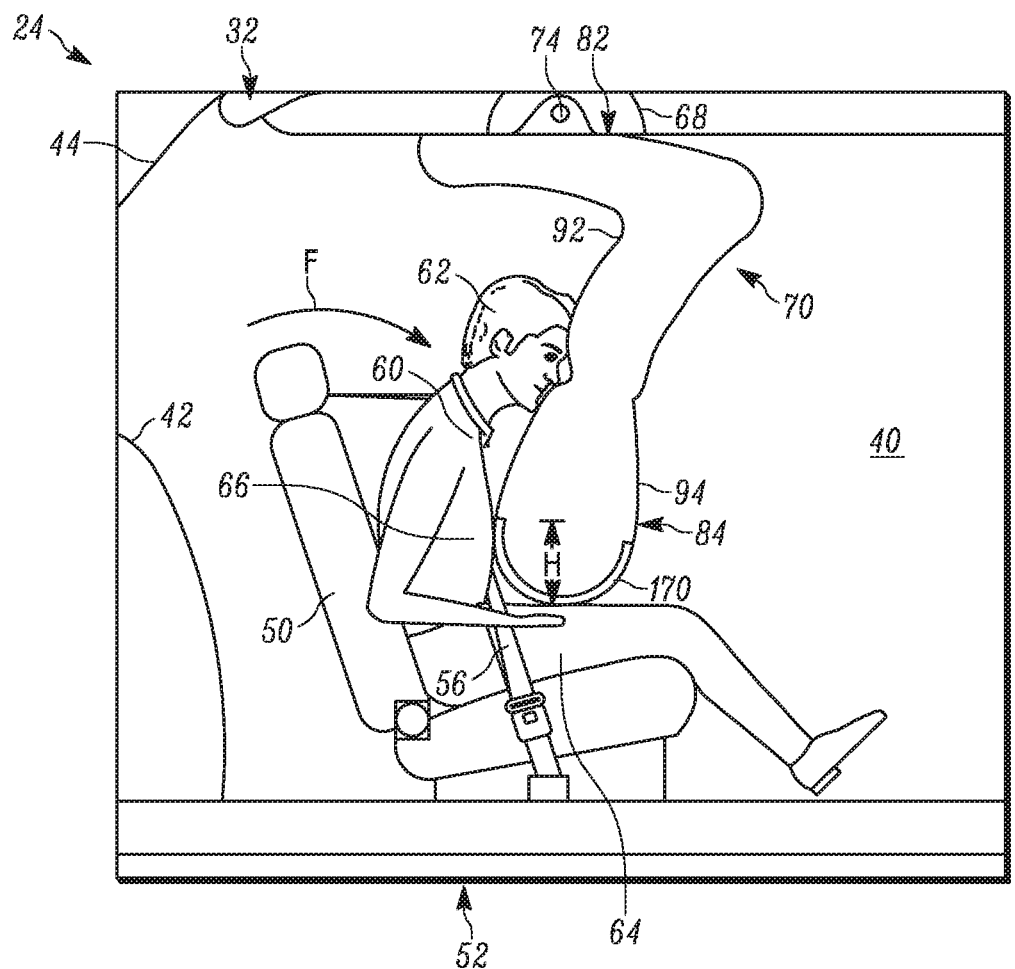
FIG. 7 is a schematic illustration of another example airbag following occupant penetration into the deployed airbag.

In another embodiment shown in FIG. 7, a portion 170 of the lower end 84 of the airbag 70 has an increased coefficient of friction relative to the remainder of the airbag for increasing the engagement between the lower end and the occupant 60. The portion 170 can be a coating or panel provided at the lower end 84. The portion 170 can be formed from, for example, silicone, fiberglass, rubber, laminate or polyethylene. Alternatively or additionally, the portion 170 can have an increased weave bias (direction) relative to the rest of the airbag 70. Regardless, the portion 170 has a coefficient of friction that is greater than the coefficient of friction of the rest of the airbag 70 (e.g., about 6% to about 65% greater).

When the airbag 70 deploys, the portion 170 engages the lap/lower torso 64 of the occupant 60. The portion 170 can also engage an upper torso 66 of the occupant 60.

Since the portion 170 has an increased coefficient of friction, the lower end 84 of the airbag 70 is securely held at its engagement points with the occupant 60. In other words, the increased friction provided by the portion 170 helps prevent relative movement between the lower end 84 of the airbag 70 and the occupant 60 during occupant penetration into the second portion 102. Consequently, the occupant's lap/lower torso 64 acts as a reaction surface to hold the lower end 84 in place during occupant 60 penetration. The portion 170 can extend to a predetermined height H from the bottom of the airbag 70 to provide sufficient engagement with the occupant 60 during airbag deployment (e.g., to ensure engagement with the upper torso 66 of the occupant).

Figure 8A:
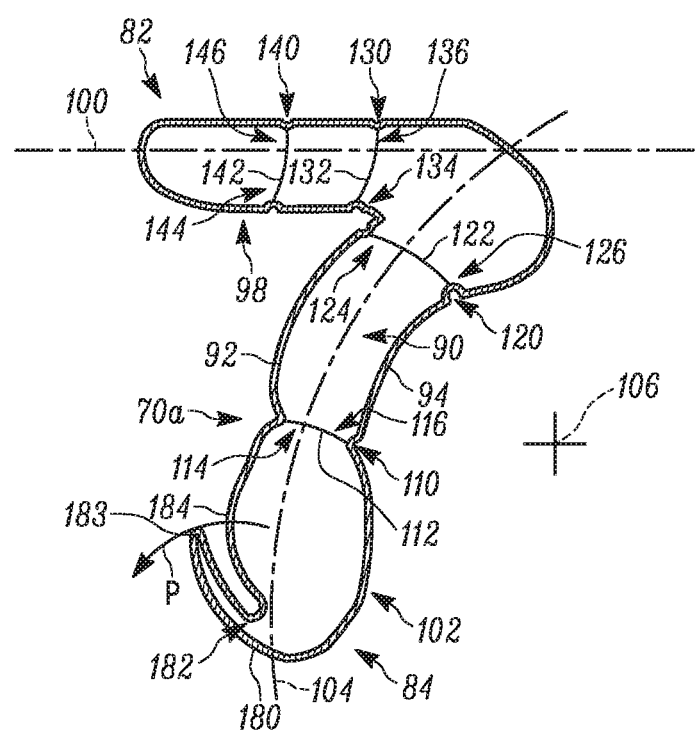
FIG. 8A is a section view of another example airbag.
Figure 8B:
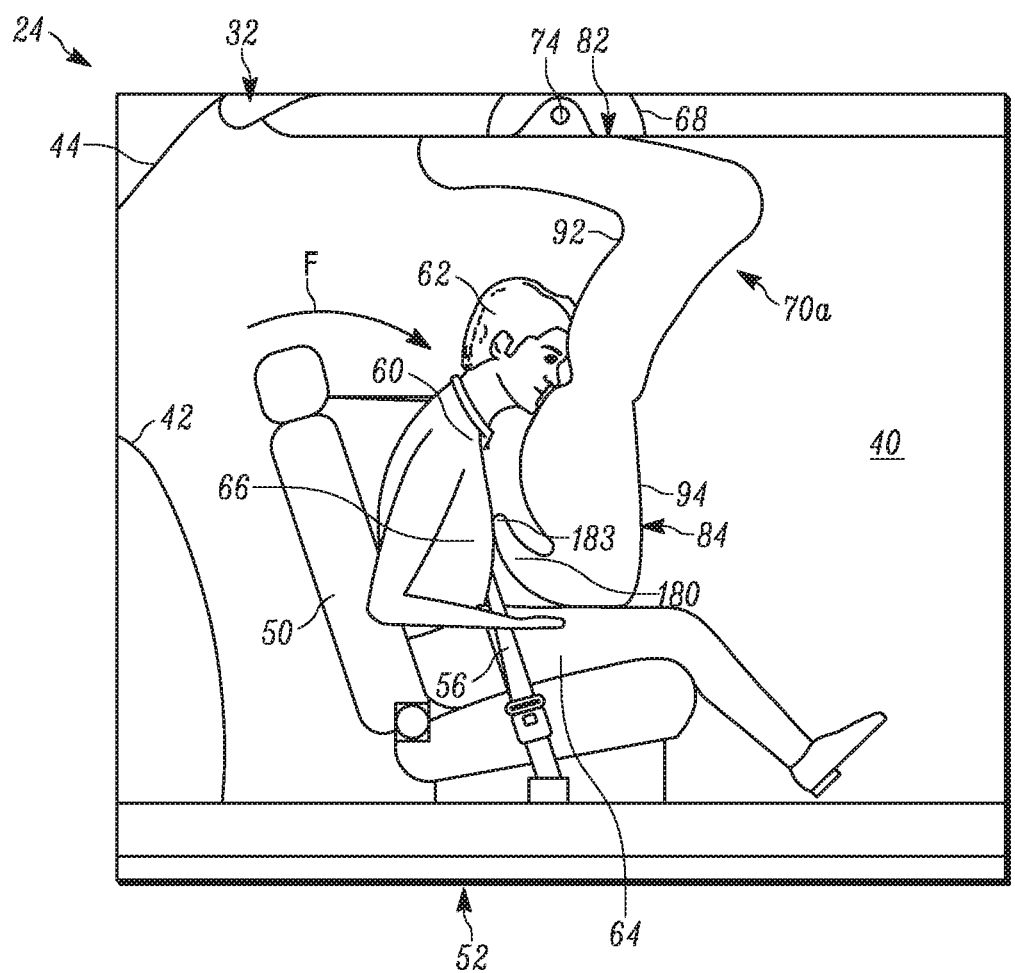
FIG. 8B is a schematic illustration of the airbag of FIG. 8A following occupant penetration into the deployed airbag.

In another embodiment shown in FIGS. 8A-8B, the lower end 84 of the airbag 70a includes an inflatable foot or projection 180. The projection 180 is configured to engage the occupant 60 during deployment such that the occupant's lap/lower torso 64 and/or upper torso 66 acts as a reaction surface to hold the lower end 84 in place during occupant penetration. To this end, the projection 180 extends from the panel 92 towards the occupant 60 (e.g., substantially parallel to the first portion 98). The projection 180 is integrally formed with the lower end 84 and defines an inflatable volume 182 in fluid communication with the inflatable volume 90. In one example, the projection can be about 100-200 mm in length in the forward-rearward direction of the vehicle 20.

During deployment, inflation fluid flows from the inflator 74, through the inflatable volume 90, and into the inflatable volume 182 of the projection 180. This causes the projection 180 to inflate and deploy away from the second portion 102. In particular, the projection 180 pivots away from the panel 92 in the manner indicated at P (counterclockwise as shown). When deployed, the projection 180 provides the airbag 70a with a larger footprint with which to engage the occupant 60 than if the projection were omitted. Consequently, the reaction force provided by the occupant 60 to the projection 180 is increased, thereby increasing the resistance of the airbag 70a to move away from the penetrating occupant.

Figure 8C:
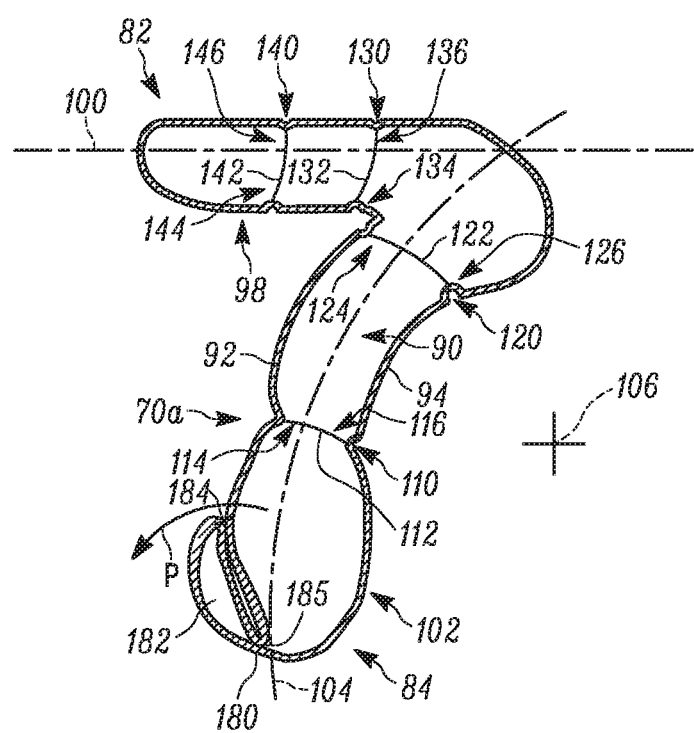
FIG. 8C is a schematic illustration of a modified version of the airbag of FIG. 8A.

Referring to FIG. 8C, in another example, prior to deployment of the airbag 70a a free end 183 of the projection 180 can be secured to the panel 92 via tear stitching 184. More specifically, the projection 180 can be pivoted upwards (clockwise as shown) and secured to the panel 92 such that portions of the lower end 84 abut one another along an interface 185. This interface 185 fluidly isolates the inflatable volume 90 from the inflatable volume 182 of the projection 180.

Due to this configuration, when the airbag 70a initially inflates, inflation fluid is prevented from passing to the projection 180, thereby reducing the total inflatable volume of the airbag and allowing the inflatable volume 90 to inflate and deploy quicker. The interface 185 is configured to allow inflation fluid to pass from the inflatable volume 90 to the inflatable volume 182 when a predetermined fluid pressure is reached in the inflatable volume 90. When this occurs, the inflatable volume 182 becomes pressurized and ultimately causes the tear stitching 184 to rupture. This allows the projection 180 to pivot in the manner P into position for engaging the occupant 60 as described above.

Figure 9:
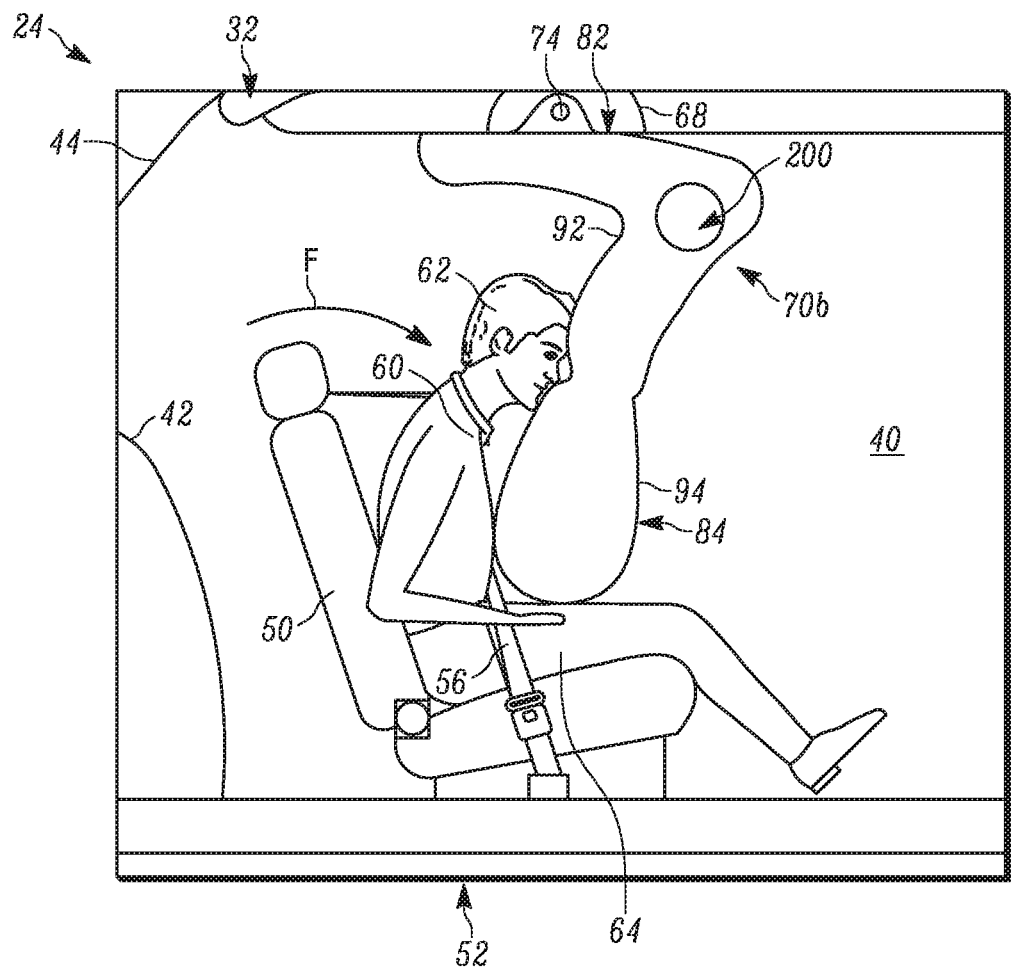
FIG. 9 is a schematic illustration of another example airbag following occupant penetration into the deployed airbag.

In another example configuration shown in FIG. 9, the airbag 70b can include an opening or passage 200 that passes entirely through the airbag in the lateral direction of the vehicle 20 (i.e., transverse to the centerline 22). As shown, the opening 200 is provided in the upper end 82 and passes entirely through the upper end. Alternatively, the opening 200 can be blind and extend only partially through the airbag 70b (not shown). In any case, the opening 200 defines an uninflated portion of the airbag 70b to thereby reduce the size of the inflatable volume 90 without affecting the size, shape, and contours of the airbag 70b. This allows a smaller, less powerful, less expensive inflator 74 to be used to inflate the airbag 70b while maintaining the deployment time and fluid pressure of the airbag 70b. Additional openings and/or different sized and shaped openings than the opening 200 shown are contemplated.

The occupant restraint system described herein is advantageous because the airbag adapts to the penetrating occupant by folding and elongating in order to provide the ride-down effect on the penetrating occupant. The degree to which the airbag folds can be readily tailored by adjusting the size of the vent, the size of the weakening, the length of the folded portion and/or the diameter of the upper chamber.

Although the descriptions of the airbags 70, 70a, 70b above is directed to the front row 52 of seats 50, it will be appreciated that the same airbags can be provided for the rear row 54 of the seats (see FIGS. 1-2). Since the seats 50 in the rows 52, 54 face in opposite directions, the purposes of their respective airbags 70 differ from each other. In the event of a frontal vehicle crash, the rearward-facing seats 50 in the front row 52 will help protect their occupants 60 by absorbing the impact of the occupants. The airbags 70, 70a, 70b of the forward-facing rear seats 50 in the rear row 54 will help protect their occupants 60 by absorbing the impact energy of the occupants. In the event of a rear vehicle crash, the seatbacks of the forward-facing seats 50 in the rear row 54 will help protect their occupants 60 by absorbing the impact with the occupants. The airbags 70, 70a, 70b of the rearward-facing seats 50 in the front row 52 will help protect their occupants 60 by absorbing the impact energy of the occupants.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A restraint system for helping to protect an occupant of a vehicle having a roof and a cabin with a seat for the occupant, comprising:
an airbag having a stored condition within the roof and being configured to inflate to a deployed condition extending into the cabin and into alignment with the seat in front of the occupant, the airbag including a first portion configured to be secured to the roof and to extend from a first terminal end portion of the airbag along the roof forward with respect to the occupant, and a second portion configured to extend from an end of the first portion opposite the first terminal end portion of the airbag diagonally downward away from the roof and toward the occupant, the second portion comprising a second terminal end portion configured to engage a lap of the occupant, wherein the second portion has a curved configuration with a convexly curved occupant receiving surface configured to face the occupant when the airbag is inflated, wherein opposite panels of the second portion of the airbag are interconnected to form inverted portions in the panels that define a first weakening of the second portion of the airbag, wherein the second portion is configured to fold away from the occupant at the first weakening in response to occupant penetration into the second portion of the airbag.

2. The restraint system of claim 1, wherein the first portion is configured to pull away from the roof in response to occupant penetration into the airbag.

3. The restraint system of claim 1, wherein the second portion is configured to curve about an axis positioned on a side of the airbag opposite the occupant.

4. The restraint system of claim 1 further comprising a tether extending within the second portion and interconnecting the opposite panels of the second portion to form the inverted portions of the second portion.

5. The restraint system of claim 1, wherein the second portion extends along a centerline and the first weakening extends about the centerline.

6. The restraint system of claim 1, further comprising a second weakening in the second portion located closer to the first portion than the first weakening to define a segment of the second portion configured to pivot about the first weakening in response to occupant penetration into the second portion.

7. The restraint system of claim 6 further comprising a tether extending within the second portion and connected to inverted portions of the second portion to define the second weakening.

8. The restraint system of claim 6, wherein the second portion is curved such that the second weakening is configured to form in the second portion automatically in response to occupant penetration into the second portion.

9. The restraint system of claim 1, further comprising a third weakening formed in the first portion of the airbag, the third weakening being configured to define a segment of the first portion configured to pivot away from the roof in response to occupant penetration into the second portion.

10. The restraint system of claim 9, wherein the first portion extends along a centerline in a fore-aft direction of the vehicle and the third weakening in the first portion extends about the centerline.

11. The restraint system of claim 1, wherein the second portion is configured to engage the lap of the occupant prior to occupant penetration into the second portion.

12. The restraint system of claim 1 further comprising a supporting tether having a first end secured to the second portion of the airbag and a second end secured to the vehicle roof.

13. The restraint system of claim 1, wherein the second terminal end portion of the airbag includes an inflatable projection configured to extend substantially parallel to the first portion, the inflatable projection being configured to engage the occupant.

14. The restraint system of claim 13, wherein the projection has a free end secured to the second portion with tear stitching, the projection being uninflated prior to rupturing of the tear stitching and being inflated after rupturing of the tear stitching.

15. The restraint system of claim 1, wherein an outer surface of the second portion of the airbag comprises a material having a coefficient of friction greater than a coefficient of friction of fabric used to construct the airbag.

16. The restraint system of claim 1, wherein an opening extends laterally through the airbag and defines an uninflated volume of the airbag.

\* \* \* \* \*